United States Patent
Desmet

(10) Patent No.: US 11,906,418 B2
(45) Date of Patent: Feb. 20, 2024

(54) DEVICE AND METHOD FOR MEASURING CONDENSATION AND/OR ADVANCE OF CORROSION

(71) Applicant: iSens Pro NV, Leuven (BE)

(72) Inventor: Yves Marie-Louis Gabriel Desmet, Meise (BE)

(73) Assignee: iSens Pro NV, Leuven (BE)

( * ) Notice: Subject to any disclaimer, the term of this patent is extended or adjusted under 35 U.S.C. 154(b) by 452 days.

(21) Appl. No.: 16/762,176

(22) PCT Filed: Nov. 7, 2018

(86) PCT No.: PCT/EP2018/080466
§ 371 (c)(1),
(2) Date: May 7, 2020

(87) PCT Pub. No.: WO2019/092015
PCT Pub. Date: May 16, 2019

(65) Prior Publication Data
US 2020/0300751 A1 Sep. 24, 2020

(30) Foreign Application Priority Data
Nov. 8, 2017 (BE) .................................. 2017/5805

(51) Int. Cl.
*G01N 17/02* (2006.01)
*G01N 27/22* (2006.01)

(52) U.S. Cl.
CPC ........... *G01N 17/02* (2013.01); *G01N 27/223* (2013.01); *G01N 27/226* (2013.01)

(58) Field of Classification Search
CPC .... G01N 27/223; G01N 27/226; G01N 17/02; G01M 3/18
See application file for complete search history.

(56) References Cited

U.S. PATENT DOCUMENTS 5,203,202 A * 4/1993 Spencer ................ G01M 3/165
73/40
5,719,340 A * 2/1998 Poortmann .......... G01N 27/226
73/861.04

(Continued)

FOREIGN PATENT DOCUMENTS

JP     S60249043 A    12/1985
JP     2005241354 A    9/2005
(Continued)

OTHER PUBLICATIONS

International Search Report and Written Opinion for the International Patent Application No. PCT/EP2018/080466, dated Mar. 15, 2019, 10 pages.

(Continued)

*Primary Examiner* — Jeff W Natalini
(74) *Attorney, Agent, or Firm* — KDW Firm PLLC

(57) ABSTRACT

A device for measuring condensation and/or advance of corrosion of a conduit includes an insulator extending around the conduit; a first conductor and a second conductor which are arranged such that at least a portion of the insulator lies between the conduit and the first conductor and the second conductor, such that the first conductor forms a first pole of a capacitor, the second conductor forms a second pole of the capacitor, and the portion therebetween comprises a capacitive coupling between the first pole and the second pole. At least one measuring instrument is configured to determine a value which is representative of the capacitive coupling.

20 Claims, 10 Drawing Sheets

(56) References Cited

U.S. PATENT DOCUMENTS

| | | | |
|---|---|---|---|
| 7,834,644 B2* | 11/2010 | Wissmath | G01N 27/24 |
| | | | 324/663 |
| 10,222,290 B2* | 3/2019 | Yunker | G01M 3/18 |
| 10,712,256 B2* | 7/2020 | Minamitani | G01N 17/002 |
| 2003/0160623 A1* | 8/2003 | Tanaka | G01N 17/02 |
| | | | 324/719 |
| 2005/0062487 A1 | 3/2005 | Strackbein et al. | |
| 2008/0191713 A1* | 8/2008 | Hauer | H03M 3/496 |
| | | | 324/658 |
| 2009/0115433 A1 | 5/2009 | Bier | |
| 2016/0025663 A1* | 1/2016 | Lehikoinen | G01N 27/22 |
| | | | 702/65 |
| 2022/0034743 A1* | 2/2022 | Acharya | G01M 3/18 |

FOREIGN PATENT DOCUMENTS

| | | |
|---|---|---|
| JP | 2009072256 A | 4/2009 |
| JP | 2017037062 A | 2/2017 |
| WO | 2015073861 A1 | 5/2015 |
| WO | 2015184514 A1 | 12/2015 |
| WO | 2016158830 A1 | 10/2016 |

OTHER PUBLICATIONS

Xiaokang Yin., "Capacitive Imaging Technique For Nondestructive Evaluation (NDE)" Submitted Feb. 2011—Thesis, University of Warwick, 264 pages.

* cited by examiner

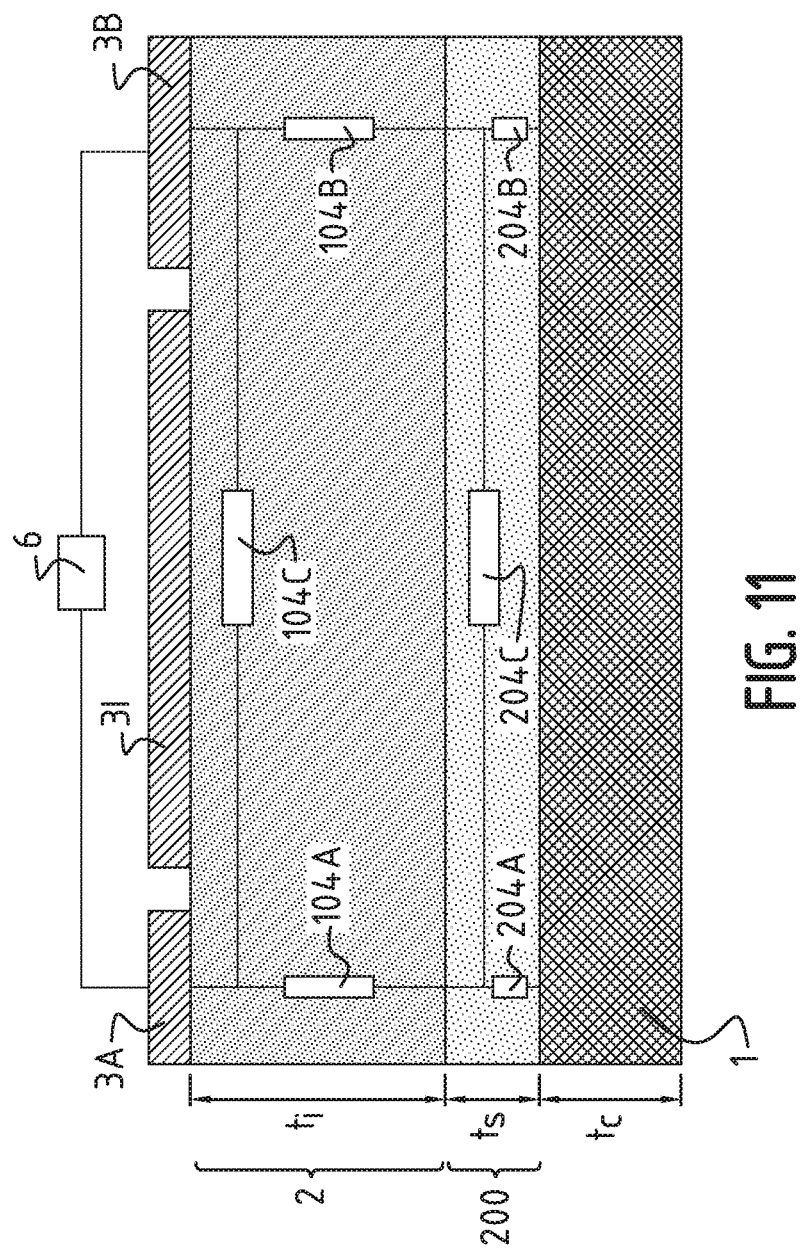

DEVICE AND METHOD FOR MEASURING CONDENSATION AND/OR ADVANCE OF CORROSION

The present invention relates to a device and method for measuring condensation and/or advance of corrosion of a conduit. In addition, the invention relates to a monitoring controller for use with one or more such devices.

For transport of some fluids it is important that these are subject as little as possible to thermal losses. The conduits for transporting such fluids colder than the dew point temperature are therefore typically thermally insulated. This takes place by enclosing for instance pipelines with insulating shells, optionally provided with a vapour barrier.

There is however the danger of condensation in such installations. Because the installations are typically exposed to ambient air, and if there is a leak in the encasing vapour barrier, the moisture in the ambient air can condense onto the conduit at the contact surface with the inner side of the insulation. The term corrosion under insulation (CUI) is typically used to describe this. Over a period of time such condensed moisture can result in corrosion of the conduit, whereby the conduit is damaged (the metal corrodes and the conduit eventually loses its flow efficiency, effectiveness, strength and watertightness). It is difficult to remove such condensed moisture and replacing a complete installation is moreover very expensive. Condensation is therefore best detected before the actual corrosion occurs, or in any case as early as possible, so that a less expensive partial replacement of the insulation is possible.

Known systems for measuring condensation on the conduit and the advance of corrosion as a result of condensation make use of thermal cameras for detecting locations with deviating thermal patterns. This solution is not efficient however because it is expensive and cumbersome and for instance does not allow detection of heat and/or cold losses in blind spots. The interpretation of such thermal detection is moreover difficult; it is not clear whether a heat or cold loss can be attributed to a locally thinner insulation or to a vapour barrier leakage, and a variation is possible due to thermal reflection on a shiny surface.

Further known measuring systems comprise time-domain reflectometry techniques determining characteristics of electrical lines by observing reflected waveforms. This technique has the disadvantage that the location of condensation and/or leakage cannot be accurately detected, especially when condensation and/or leakage occur at different locations along the line. These systems still require a user to search for leakages and condensation on conduits through means of thermal cameras.

In order to solve these problems the Belgian patent application BE 2014/0429, granted by now as Belgian patent BE 1022693 B9, in the name of the same applicant as the present patent application, provides a device for electrically conductive conduits, wherein an insulator extends around the conduit, and wherein at least one electrical conductor is arranged over, on or in the insulator such that at least a portion of the insulator lies between the conduit and the or each conductor and such that the conduit forms a first pole of a capacitor, the or each conductor forms a second pole of this capacitor, and the portion therebetween forms part of a dielectric, and wherein at least one measuring instrument is configured to determine for the or each conductor a value which is representative of the capacitive action of the corresponding capacitor.

In such devices there is however the problem of the conduit having to be electrically conductive. As a result, such devices cannot be used without question for instance plastic conduits. In such devices there is moreover a risk of an electrical short-circuit occurring between the conduit and the at least one electrical conductor, for instance at the position of conduit valves or other protrusions, so that said capacitive action is impeded and, as a result, the measurement is no longer worthwhile.

It is an object of the present invention to solve these problems.

The invention provides for this purpose a device for measuring condensation and/or advance of corrosion of a conduit, comprising: an insulator extending around the conduit; as well as a first and second conductor which are arranged such that at least a portion of the insulator lies between the conduit and the first conductor and the second conductor, such that the first conductor forms a first pole of a capacitor, the second conductor forms a second pole of the capacitor, and the portion therebetween comprises a capacitive coupling between the first pole and the second pole. The device also comprises at least one measuring instrument configured to determine a value which is representative of the capacitive coupling.

This solution allows condensation and/or advance of corrosion to be measured with all manner of conduits, which need not necessarily be electrically conductive, since it is not the conduit itself which is used as second pole of the capacitor but a conductor provided separately for this purpose. For the same reason, the risk of a worthless measurement as a result of an electrical short-circuit between the conduit and one of the two conductors can moreover be reduced because even if one of the two conductors were to make unintended electrical contact with the conduit, the other of the two conductors keeps functioning as reverse pole of the capacitor. The inventiveness of this solution is based inter alia on the innovative insight of the inventor that the capacitive action between the first conductor and the second conductor can be measured more accurately than in the known device between the position of the conductor and the position of the conduit. Tests have shown that in the case of leakage the determined value (in this case the capacity itself) can change by a factor in the order of magnitude of 100 or 1000, while in the case of temperature and humidity fluctuations in the surrounding area only very small changes (in the order of magnitude of a few percent) occur, which allows condensation and/or advance of corrosion to be measured.

It is an additional advantage of embodiments of the device that the first and the second conductor and the measuring instrument can be arranged on an already installed insulator, without electrical connections still having to be made between the measuring instrument and the conduit.

According to an embodiment, seen in a longitudinal direction of the conduit, the first and second conductor are arranged at a distance of each other or the first and second conductor overlap only partially at an outer end thereof. In this way the capacitive coupling can extend along a substantial length of the insulator allowing detecting any condensation or leakage along this length.

A first measuring instrument of said at least one measuring instrument may be arranged, typically fixed, on the insulator or on an outer layer on the insulator, between the first and second conductor. For example, there may be arranged an outer layer on the insulator between the first and the second inductor, and the first measuring instrument may be fixed on the outer layer. The outer layer may be an electrically conductive outer layer, and this electrically conductive outer layer may be grounded or floating.

According to an embodiment, the device comprises a third conductor which is arranged such that at least a further portion of the insulator lies between the conduit and the second and the third conductor, such that the second conductor forms a first pole of a further capacitor, the third conductor forms a second pole of the further capacitor, and the further portion therebetween comprises a further capacitive coupling between the first pole and the second pole; wherein the at least one measuring instrument is configured to determine a value which is representative for the further capacitive coupling. In this way a greater portion of the insulator can be monitored with the at least one measuring instrument.

According to an embodiment, seen in a longitudinal direction of the conduit, the second and third conductor are arranged at a distance of each other or the second and third conductor overlap only partially at an outer end thereof.

According to an embodiment, the first conductor extends over a first length seen in the longitudinal direction of the conduit, and a surface area of the first conductor is at least 10% of a surface area of the conduit along the first length, preferably at least 25%, more preferably at least 50%. The surface area may also be equal to the surface area of the conduit along the first length, or even larger than the surface area of the conduit along the first length. By increasing the surface area of the first and second conductor, the capacitive coupling between of the first and second conductor is increased. Hence the accuracy of the measurement will be increased.

According to an embodiment, the first conductor and the second conductor are each embodied as an electrically conductive coating or cladding for the insulator. In this way the device can be installed as a whole (with or without the at least one measuring instrument) more simply.

According to an embodiment, the first conductor and the second conductor are each shaped as at least a portion of an electrically conductive sleeve configured to accommodate at least a portion of the insulator. In this way the respective poles of the capacitor can cover a large surface area and thus have a greater capacity.

According to an embodiment, the at least one measuring instrument can be configured to determine a frequency value which is representative of the capacitive coupling. In this way use can be made of a simply determinable parameter for determining the value which is representative of the capacitive coupling.

According to an embodiment, at least one measuring instrument can be configured to drive a variable frequency alternating voltage or current through the capacitive coupling and to measure amplitude and phase changes thereof. In this way use can be made of simply determinable parameters (amplitude and phase or real and imaginary part of the alternating voltage or current) for the purpose of determining the impedance value which is representative of the connection. This impedance is frequency-dependent and gives an indication of the advance of condensation and corrosion.

According to an embodiment, the at least one measuring instrument can comprise at least one oscillator.

According to an embodiment, the at least one measuring instrument can be integrated in the insulator. In this way the at least one measuring instrument is better protected from external influences.

According to an embodiment, the at least one measuring instrument can comprise at least one of the following power supplies: a wire supply, an energy yield supply; and a battery supply. A very long lifespan of the measurement can be obtained with a wire supply, while a battery supply can be inexpensive and simple to install. An energy yield supply can be very energy-efficient and autonomous, which can be advantageous in the case of conduits which are difficult to reach (such as long-distance conduits).

According to an embodiment, the at least one measuring instrument can be configured to transmit the determined value wirelessly to a wireless receiver of a monitoring controller, preferably by means of communication technology with low power and far reach (Low-Power Wide-Area Network). In this way the convenience of use can be increased. In addition, central control can be made possible.

According to an embodiment, the first conductor and the second conductor can be arranged at pitch distance from each other along the insulator. In this way a greater expanse of the conduit can be covered and the accuracy of the measurement can be increased.

According to an embodiment, the device can comprise a monitoring controller which is configured to analyse condensation and/or advance of corrosion of the conduit on the basis of the value or values determined by the or each measuring instrument.

According to an embodiment, the device can comprise at least one temperature sensor configured to measure a temperature, preferably at the position of the insulator, and/or at least one moisture sensor configured to measure a degree of moisture, wherein the monitoring controller is configured during analysis of the condensation and/or advance of corrosion to take into account the measured temperature and/or the measured degree of moisture. The temperature sensor and/or the moisture sensor allow analysis to be performed with greater precision.

According to an embodiment, the conduit can be electrically conductive and the at least one measuring instrument can be configured during determining of the value to take into account the capacitive action of a first additional capacitor with poles formed by the first conductor and the conduit, and the capacitive action of a second additional capacitor with poles formed by the second conductor and the conduit.

In this way the device according to the invention can not only be used efficiently with electrically non-conductive conduits, but can likewise be used with conduits which are electrically conductive. In this latter case the capacitive coupling can advantageously be measured up to a position deeper in the insulator (i.e. closer to the conduit) since the conduit then forms an electrical contact point between on the one hand a first additional capacitor formed by the first conductor and the conduit and on the other a second additional capacitor formed by the conduit and the second capacitor, wherein the insulator in each case serves as respective dielectric. Such a measurement can be even more effective when the insulator is vapour-tight, since forming condensation is then able to spread at the position of the conduit.

According to an embodiment, the conduit can be grounded. Alternatively, the conduit can be a floating conduit.

According to an embodiment, a transition area between the first conductor and the second conductor can comprise a moisture-resistant strip, preferably butyl tape or rubber. In this way the insulator can be better protected against moisture penetrating from outside.

According to an embodiment, at least one of the first conductor and the second conductor can be at least partially manufactured from aluminium or from stainless steel. In this way the device can be more weather-resistant.

According to an embodiment, at least one of the first and the second conductor comprises a plurality of interconnected electrically conductive layer elements. For example, the electrically conductive layer elements may be elongated elements extending in a longitudinal direction of the conduit and arranged around the conduit, at a distance of each other seen in a section perpendicular to the longitudinal direction. In this way a substantially large surface area of the conductor is achieved while reducing material costs and making the device more lightweight such that the mounting of the device is easier. In this way the surface area of the conductor is substantially larger than the thickness, thereby increasing the capacitive coupling between the first and the second conductor. For example, the plurality of electrically conductive elongated elements may be strip like. In other exemplary embodiment the electrically conductive layers may be cylindrical elements arranged at a distance of each other seen in the longitudinal direction.

In an exemplary embodiment the plurality of interconnected electrically conductive layer elements are inserted between a first insulation layer and a second insulation layer, wherein in the first and second insulation layer together form the insulator. By using a plurality of interconnected electrically conductive layer elements instead of a complete sleeve, the adhesion between the first insulation layer and the second insulation layer can be improved.

According to an embodiment, the first and the second conductor are embedded in the insulator. For example, the insulator may comprise a first insulator layer extending around the conduit and a second insulator layer extending around the first insulator, wherein the first and second conductor are at least partially embedded in the second insulator layer. In this way the first and second conductor can be easily integrated in the insulator and protected against external influences from the environment.

According to an embodiment, the device further comprises connecting means between a measuring instrument and the first and second conductor, said connecting means extending from the first and second conductor through the insulator to the measuring instrument. In this way the measuring instrument is easily connected to the conductor thereby reducing the time needed to mount the measuring instrument.

According to an embodiment, the first conductor has a first end and a second end and the device further comprises a first connector element extending through the insulator from said first end; and a second connector element extending through the insulator from the second end.

The invention further provides a monitoring controller for use with one or more devices as described above, the monitoring controller being configured to receive one or more values determined by the at least one measuring instrument and to analyse condensation and/or advance of corrosion of the conduit on the basis of the received value or values.

The skilled person will appreciate that advantages and objectives similar to those for the device apply for the corresponding monitoring controller, mutatis mutandis.

According to an embodiment, the monitoring controller can comprise a wireless receiver which is configured to receive the value or values determined by the at least one measuring instrument.

The invention further provides a method for measuring condensation and/or advance of corrosion of a conduit. The method comprises of arranging an insulator around the conduit. The method also comprises of arranging a first conductor and a second conductor, such that at least a portion of the insulator lies between the conduit and the first conductor and the second conductor, such that the first conductor forms a first pole of a capacitor, the second conductor forms a second pole of the capacitor, and the portion therebetween comprises a capacitive coupling between the first pole and the second pole. The method also comprises of determining a value which is representative of the capacitive coupling.

The skilled person will appreciate that advantages and objectives similar to those for the device apply for the corresponding method, mutatis mutandis.

According to a preferred embodiment, the first and second conductors are arranged at a distance of each other seen in a longitudinal direction of the conduit, or such that the first and second conduits overlap only partially at an outer end thereof.

According to a preferred embodiment, a third conductor is arranged such that at least a further portion of the insulator lies between the conduit and the second and the third conductor, and such that the second conductor forms a first pole of a further capacitor and the third conductor forms a second pole of the further capacitor, and the further portion of the insulator comprises a further capacitive coupling between the first pole and the second pole; and a value which is representative for the further capacitive coupling is determined. Preferably, the second and third conductors are arranged at a distance of each other, or such that the second and third conductor overlap only partially at an outer end thereof, seen in a longitudinal direction of the conduit.

According to a preferred embodiment, each conductor is provided along a first length with a surface area which is at least 10% of a surface area of the conduit along the first length, preferably at least 25%, more preferably at least 50%. The surface area may also be more or less equal to the surface area of the conduit along the first length, or even larger than the surface area of the conduit along the first length.

The length of a conductor may be e.g. between 0.5 m and 10 m, depending on the type of conduits to be insulated. The diameter of the insulator may be e.g. between 5 mm and 1200 mm, preferably between 10 mm and 500 mm. A distance between the first conductor and the second conductor may be e.g. between 1 cm and 200 cm, preferably between 2 cm and 150 cm.

According to a preferred embodiment, the method comprises of providing each of the first conductor and the second conductor as an electrically conductive coating or cladding for the insulator.

According to a preferred embodiment, the method comprises of providing each of the first conductor and the second conductor as at least a portion of an electrically conductive sleeve configured to accommodate at least a portion of the insulator.

According to a preferred embodiment, the method of determining the value comprises of determining a frequency value which is representative of the capacitive coupling.

According to a preferred embodiment, the method comprises of driving a variable frequency alternating voltage or current through the capacitive coupling and of measuring amplitude and phase changes thereof.

According to a preferred embodiment, the method comprises of integrating at least one measuring instrument in the insulator.

According to a preferred embodiment, the method comprises of transmitting the determined value wirelessly to a wireless receiver of a monitoring controller, preferably by means of communication technology with low power and far reach (Low-Power Wide-Area Network).

According to a preferred embodiment, the method comprises of arranging the first conductor and the second conductor at pitch distance from each other along the insulator.

According to a preferred embodiment, the method comprises of analysing condensation and/or advance of corrosion of the conduit on the basis of the determined value or values.

According to a preferred embodiment, the method comprises of measuring a temperature, preferably at the position of the insulator, and/or of measuring a degree of moisture; and analysing the condensation and/or advance of corrosion while taking into account the measured temperature and/or the measured degree of moisture.

According to a preferred embodiment, the conduit is electrically conductive and determining of the value comprises of taking into account the capacitive action of a first additional capacitor with poles formed by the first conductor and the conduit, and the capacitive action of a second additional capacitor with poles formed by the second conductor and the conduit.

According to a preferred embodiment, the method comprises of grounding the conduit. Alternatively, the method comprises of having the conduit float.

According to a preferred embodiment, the method comprises of arranging a moisture-resistant strip, preferably butyl tape or rubber, in a transition area between the first conductor and the second conductor.

According to an exemplary embodiment, the method comprises embedding the first and the second conductor in the insulator. For example, a first insulator layer may be arranged around the conduit and a second insulator layer may be arranged around the first insulator layer, wherein the first and second conductor may be at least partially embedded in the second insulator layer or may be inserted between the first and the second insulator layer.

According to an exemplary embodiment, the arranging of the first and/or the second conductor comprises arranging a plurality of interconnected electrically conductive elongated elements around the conduit, for example a plurality of interconnected electrically conductive elongated elements extending in a longitudinal direction of the conduit and arranged around the conduit, at a distance of each other seen in a section perpendicular to the longitudinal direction.

According to an exemplary embodiment, the determining of a value comprises connecting a measuring instrument using connection means extending from the first and second conductor through the insulator to the measuring instrument. For example, the method may comprise arranging a first connector element through the insulator to the first conductor and arranging a second connector element through the insulator to the second conductor.

The invention further provides a method for analysing condensation and/or advance of corrosion of a conduit, comprising of receiving one or more values determined according to one of the above described methods; and of analysing the condensation and/or the advance of corrosion of the conduit on the basis of the received value or values.

According to an embodiment, the method comprises of wirelessly receiving the one or more determined values.

According to another aspect of the invention there is provided a device for measuring degradation of a surface layer on a conduit, comprising: an insulator extending around the surface layer on the conduit; a first conductor and a second conductor at a distance of the first conductor, said first and second conductor being arranged such that at least a portion of the insulator lies between the conduit and the first conductor and between the conduit and the second conductor; and at least one measuring instrument configured to determine a value which is representative of the impedance of the surface layer underneath said portion of the insulator.

According to prior art solutions degradation of a surface layer is typically measured directly on the surface layer using an electrochemical impedance spectroscopy measurement. In the event of isolated conduits where the surface layer is not directly accessible, a possibility would be to perform a measurement between the conduit and a conductor arranged around the insulator. However, it has been found that such measurements do not provide accurate results due to external noise. By using a first and a second conductor as specified above, any external noise will be present both on the first and the second conductor, and will be cancelled out as the measurement is a differential measurement performed between the first and the second conductor.

The at least one measuring instrument may comprise an AC impedance measurement apparatus, e.g. an electrochemical impedance spectroscopy measurement instrument. Using such a measurement, the phase and amplitude of the impedance is obtained in function of the frequency. When the surface layer degrades, the impedance of the surface layer changes, which causes a change in the phase measurement and a change in the amplitude measurement.

In addition or alternatively, the at least one measuring instrument may comprise a DC measurement apparatus, such as a potentiostat or a Galvanostat. For example, a potentiostat measurement will work, when the insulator is already wet, so that ion transport can take place through the insulator and through the surface layer, resulting in a measurement value representative for the impedance of the surface layer. Also other measurement instruments are possible as long as it is possible to determine a value which is representative of the degradation of the surface layer underneath said portion of the insulator. The device may further comprise a monitoring controller which is configured to analyse degradation of the surface layer on the basis of the value or values determined by the at least one measuring instrument.

The surface layer may be e.g. any one of the following: a coating, a cover layer, an oxidation layer. For example, the surface layer may be a corrosion resistant layer, a protective layer, etc.

The surface layer may be a layer which is adhered to the conduit, or may be a layer which is not adhered to the conduit. e.g. a separate foil.

A thickness of the surface layer is typically smaller than a wall thickness of the conduit. For example, the surface layer may have a thickness which is smaller than 10 mm, preferably smaller than 9 mm, more preferably smaller than 8 mm.

According to another aspect of the invention there is provided a method for measuring degradation of a surface layer on a conduit, comprising: arranging an insulator around the surface layer on the conduit; arranging a first conductor and a second conductor at a distance of the first conductor, such that at least a portion of the insulator lies between the conduit and the first conductor and between the conduit and the second conductor; and determining a value which is representative of the impedance of the surface layer underneath said portion of the insulator. The method may further comprise analysing degradation of the surface layer on the basis of the determined value or values.

The determining may be done using an AC impedance measurement, such as an electrochemical impedance spectroscopy, or a DC measurement, such as a measurement with a potentiostat or a Galvanostat.

The preferred and exemplary features disclosed above for the device and method for measuring condensation and/or advance of corrosion of a conduit may also be present in the device and method for measuring degradation of a surface layer on a conduit. Also, the devices/methods may be combined, i.e. the sane device may be provided with a first measurement instrument to determine a value which is representative of the capacitive coupling and a second measuring instrument to determine a value which is representative of the impedance of the surface layer underneath said portion of the insulator. Indeed, the same insulator and first and second conductor may be used to perform both measurements. When the devices/methods are combined, the first measurement instrument configured to determine a value which is representative of the capacitive coupling may perform measurements on a regular basis with a first frequency. The second measuring instrument configured to determine a value which is representative of the impedance of the surface layer will typically require a more complex measurement which takes longer to perform compared to the duration of the first measurement of a value which is representative of the capacitive coupling. In possible embodiments, the measurement by the second measuring instrument to determine a value which is representative of the impedance of the surface layer, may be performed either on a regular basis but typically with a second frequency which is lower than the first frequency, or on an irregular basis, e.g. only when the first measurement by the first measurement instrument indicates leakage or water ingress or condensation.

According to another aspect of the invention there is provided, an insulation element, preferably for use in the device or method according to any of the embodiments above, comprising an insulator sleeve configured for extending around a conduit and having an outer surface; a conductor embedded in the insulator sleeve; at least one connection element extending from the conductor through the insulator sleeve to the outer surface thereof. Such insulating elements may be arranged around a conduit, next to each other, seen in a longitudinal direction of the conduit. The connection element allows connecting the conductor to a measuring instrument or to another conductor of an adjacent insulation element.

According to an exemplary embodiment, the conductor is shaped as a conductor sleeve having a length which is smaller than a length of the insulator sleeve and which is fully embedded in the insulator sleeve. According to another embodiment, the conductor comprises a plurality of interconnected electrically conductive layer elements, for example elongated elements extending in a longitudinal direction of the insulator sleeve and arranged around the insulator sleeve, at a distance of each other seen in a section perpendicular to the longitudinal direction.

According to an exemplary embodiment, the insulator sleeve comprises a first insulator layer and a second insulator layer. The conductor may be arranged between the first and the second insulator layer, or may be embedded in the second insulator layer.

According to an exemplary embodiment, the insulation element further comprising a measuring instrument arranged on or in the insulator sleeve. The measuring instrument may be configured to transmit a measured value wirelessly to a wireless receiver of a monitoring controller, preferably by means of communication technology with low power and far reach (Low-Power Wide-Area Network).

According to an exemplary embodiment, a surface area of the conductor is larger than 10% of the surface area of the outer surface of the insulator sleeve, preferably larger than 25%, more preferably larger than 50%.

According to an exemplary embodiment, the conductor is formed as an electrically conductive coating or cladding.

According to an exemplary embodiment, the insulation element comprises at least one temperature sensor configured to measure a temperature and/or at least one moisture sensor configured to measure a degree of moisture.

According to an exemplary embodiment, the conductor is at least partially manufactured from aluminium or steel, e.g. stainless steel or galvanised steel.

According to an exemplary embodiment of the insulation element, the at least one connector element comprises a first connector element arranged at a first end of the conductor seen in a longitudinal direction of the insulator sleeve and a second connector element arranged at the other end of the conductor.

The length of a conductor may be e.g. between 0.5 m and 10 m, depending on the type of conduits to be insulated. The diameter of the insulator may be e.g. between 5 mm and 1200 mm, preferably between 10 mm and 500 mm.

The invention further relates to an assembly of insulation elements as described above. When arranging insulation elements around a conduit, the conductor of a first insulation element may be electrically connected to a conductor of one or two adjacent insulation elements. Also the conductor may be connected to a measuring instrument. This allows to form a device as described above in a convenient manner.

The skilled person will appreciate that advantages and objectives similar to those for the device apply for the insulation element and the assembly of insulating elements, mutatis mutandis.

The invention will now be further described with reference to an exemplary embodiment shown in the drawing. These exemplary embodiments are intended for the purpose of a better understanding of the above described features, advantages and objectives of the invention; they do not limit the invention in any way.

Figure 9:
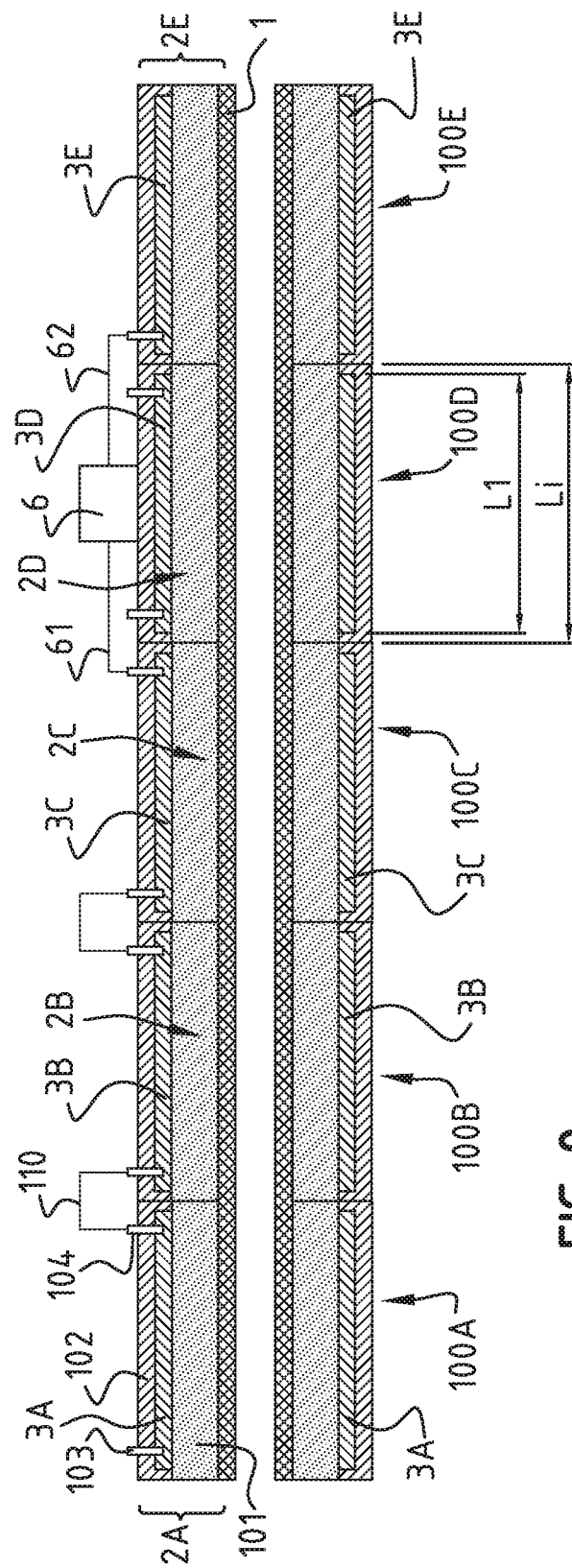
Figure 10:
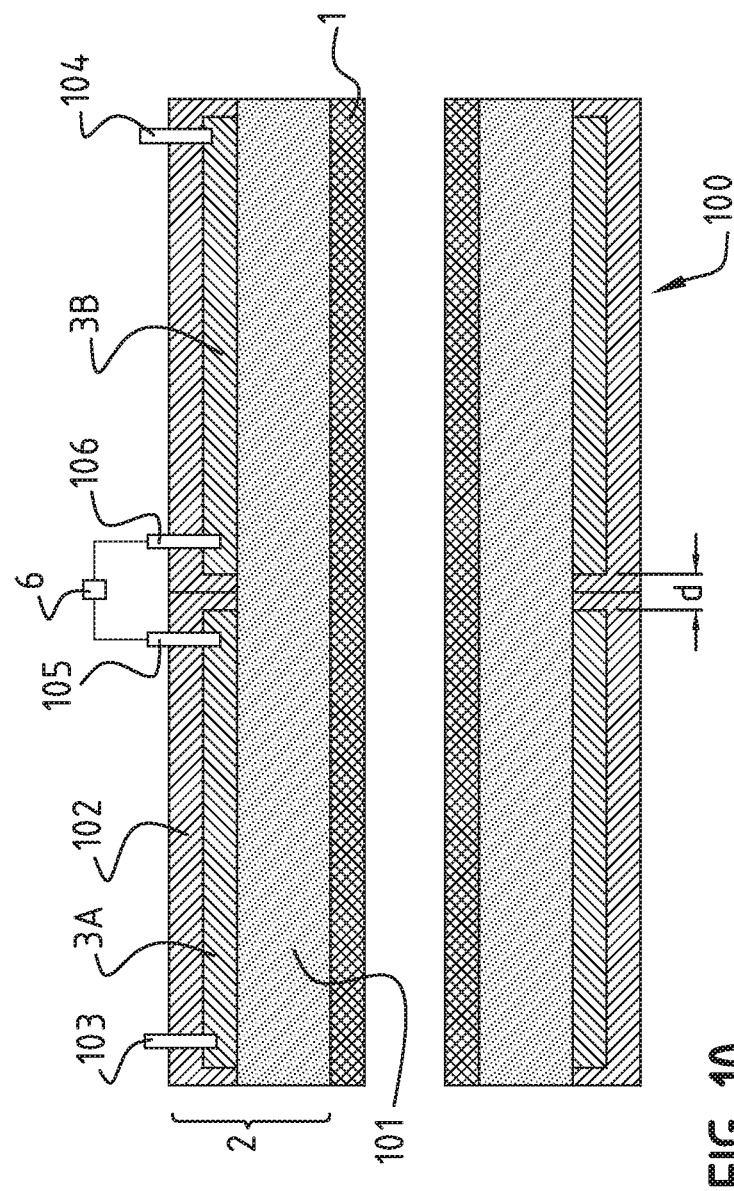
Figure 12A:
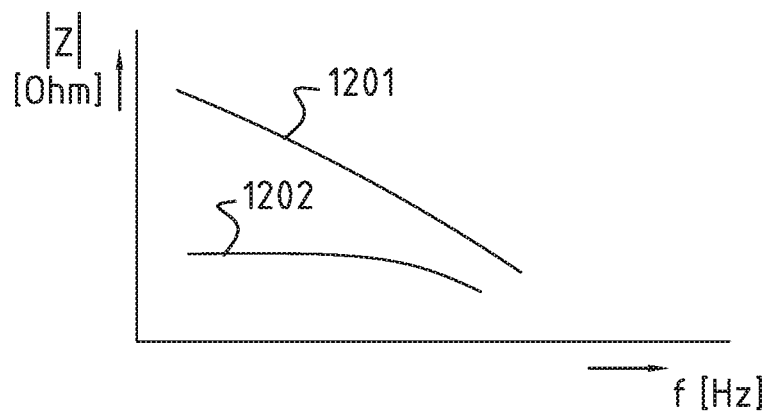
Figure 12B:
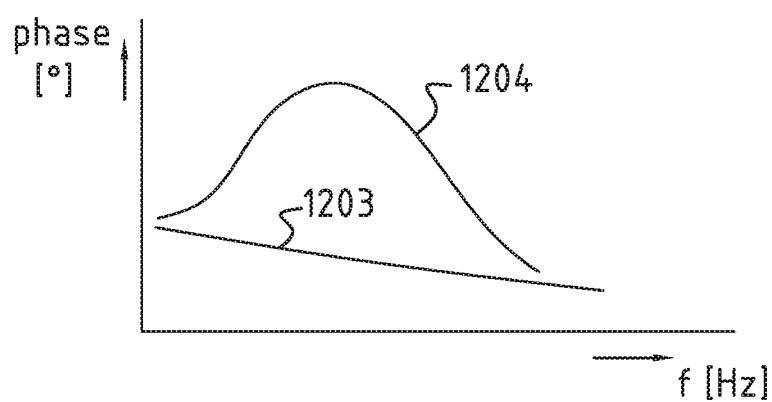

FIG. 8A-D schematically represent alternative embodiments of a device, illustrating different ways of connecting the measuring instruments;

FIG. 9 is a schematic longitudinal sections of an embodiment of an assembly of insulation elements; and FIG. 10 is a schematic longitudinal section of an embodiment of an insulation element;

FIG. 11 illustrates schematically an embodiment of a device for determining degradation of a surface layer on a conduit; and FIGS. 12A and 12B illustrate a measured amplitude and phase in function of frequency, respectively, for a device with a conduit with an intact surface layer and with a degraded surface layer.

The same or similar elements are designated in the drawing with the same reference numeral.

Figure 1A:
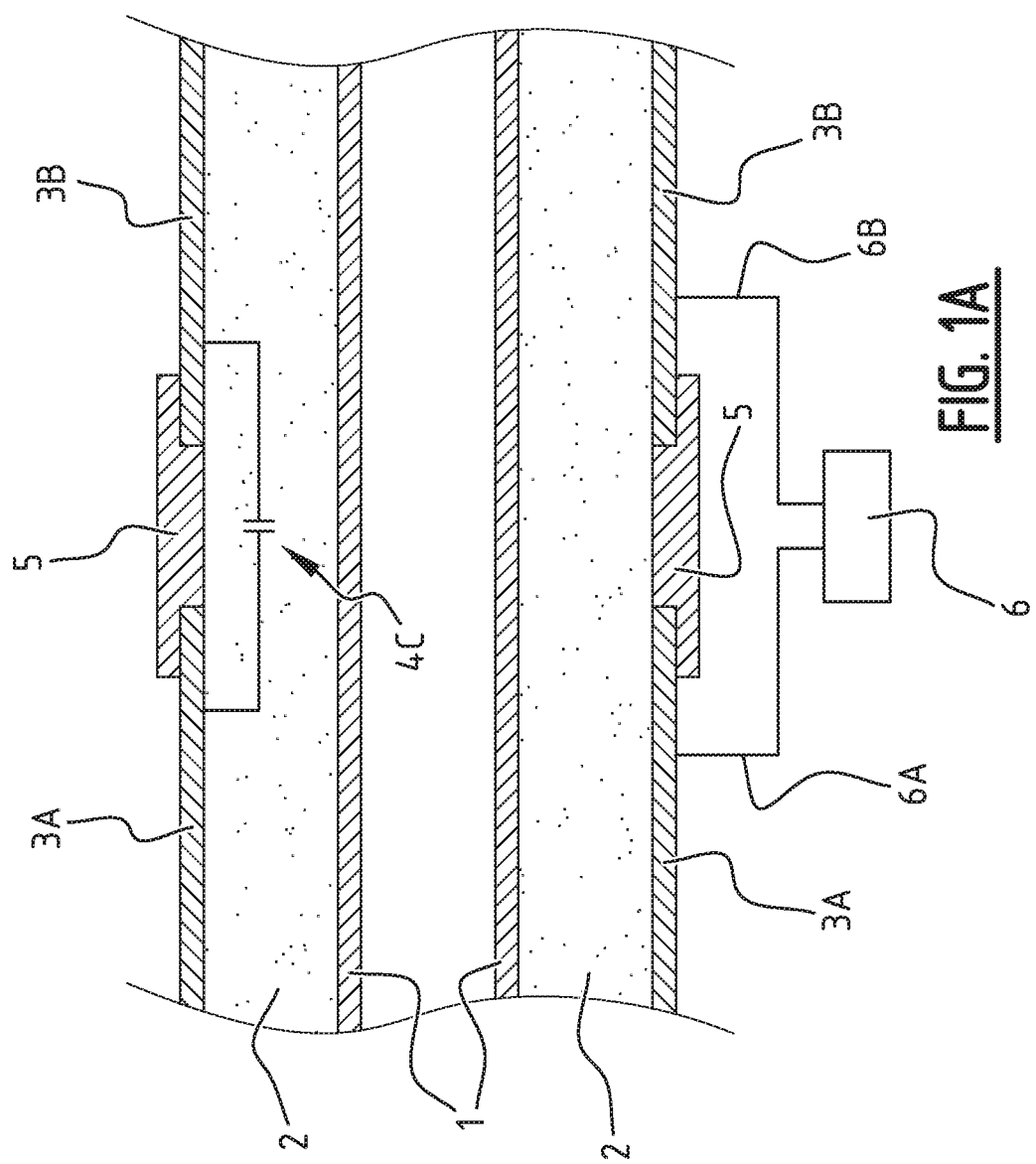
FIG. 1A is a schematic representation of an embodiment of a device according to the invention in longitudinal section along the longitudinal direction of an electrically non-conductive conduit.

FIG. 1A shows a schematic representation of an embodiment of a device according to the invention in longitudinal section along the longitudinal direction of an electrically non-conductive conduit. The figure shows conduit 1 in cross-section along its longitudinal axis, although the skilled person will appreciate that other embodiments of the invention can also be applied in differently shaped conduits.

An insulator 2 extends around conduit 1. Insulator 2 can be configured for thermal insulation, but (alternatively or additionally) also for acoustic insulation. Insulator 2 can for instance comprise pre-formed shells which are clamped or fastened around conduit 1, or can for instance comprise mats which are wrapped around conduit 1. Embodiments of the invention can be applied with all types and forms of insulator.

In insulator 2 first conductor 3A and second conductor 3B are arranged such that at least a portion of insulator 2 lies between conduit 1 and first conductor 3A and second conductor 3B, such that first conductor 3A firms a first pole of capacitor 4C, second conductor 3B forms a second pole of capacitor 4C, and the portion therebetween comprises a capacitive coupling between the first pole and the second pole. In other words, capacitor 4C has two poles, i.e. first conductor 3A and second conductor 3B, and the portion of insulator 2 lying between the two poles can serve as (part of) a dielectric for capacitor 4C. The whole capacitive coupling can then for instance be designated as $C_{eq}$ (not shown), as done in FIGS. 2-4.

FIG. 1A further shows measuring instrument 6, which is configured to determine a value which is representative of the capacitive coupling. Measuring instrument 6 can for this purpose be connected respectively to first conductor 3A by means of first connection 6A and to second conductor 3B by means of second connection 6B. The skilled person will appreciate that measuring instrument 6 is shown schematically in the embodiment shown in the figure, and that all manner of practical embodiments can be opted for, depending on the practical situation.

In some embodiments measuring instrument 6 can transmit the determined value preferably wirelessly to (a wireless receiver of) a monitoring controller (not shown) for use with one or more devices according to the invention. The monitoring controller can be configured to receive one or more values determined by measuring instrument 6 and to analyse condensation and/or advance of corrosion of conduit 1 on the basis of the received value or values. If wireless communication is used, this can for instance be done by means of communication technology with low power and far reach (Low-Power Wide-Area Network). Examples hereof are: LoRa/LoRaWAN, SigFox, Bluetooth (LE). Alternatively, use can also be made of communication technology with a relatively higher power, such as wireless local network technology (Wireless Local Area Network, WLAN, such as Wi-Fi, i.e. IEEE 802.11) or mobile cellular network technology (such as GSM and related standards and protocols).

FIG. 1A also shows optional strip 5 which covers an area of insulator 2 lying in a transition area between first conductor 3A and second conductor 3B. In this context a transition area can comprise an area or space lying between edges and/or walls of outer ends of first conductor 3A and second conductor 3B. Strip 5 is advantageously moisture-resistant in order to impede moisture penetrating from outside. In preferred embodiments it is possible to opt for butyl tape or rubber. It is advantageous for strip 5 also to cover a sufficiently wide part (for instance at least 1 cm, preferably at least 5 cm) of respective outer ends of first conductor 3A and second conductor 3B in order to obtain a better operation.

According to alternative embodiments, first conductor 3A and second conductor 3B can be integrated in a coating or cladding of insulator 2. This has the advantage that the device can be installed as a whole, which requires fewer operational steps.

In a specific embodiment (as shown here) first conductor 3A and second conductor 3B are each shaped as at least a portion of an electrically conductive sleeve which is configured to accommodate at least a portion of insulator 2. This has the advantage that each of the conductors can cover a greater surface area than in some other forms (such as cords or elongate plates), so that the capacity can also be greater.

In some embodiments measuring instrument 6 can be powered by means of a potential wire (not shown). This has the advantage that the measurement can be more accurate. In other embodiments measuring instrument 6 can be powered by means of a battery (not shown). This has the advantage that it is cheaper and that installation is easier. In a preferred embodiment the two options can be combined, and it is for instance possible to first use a battery supply over short segments in the short term for general detection of whether there is a risk of condensation and/or advance of corrosion, and then, after detection thereof, to continue with a wire supply in the longer term in order to measure more accurately.

Figure 1B:
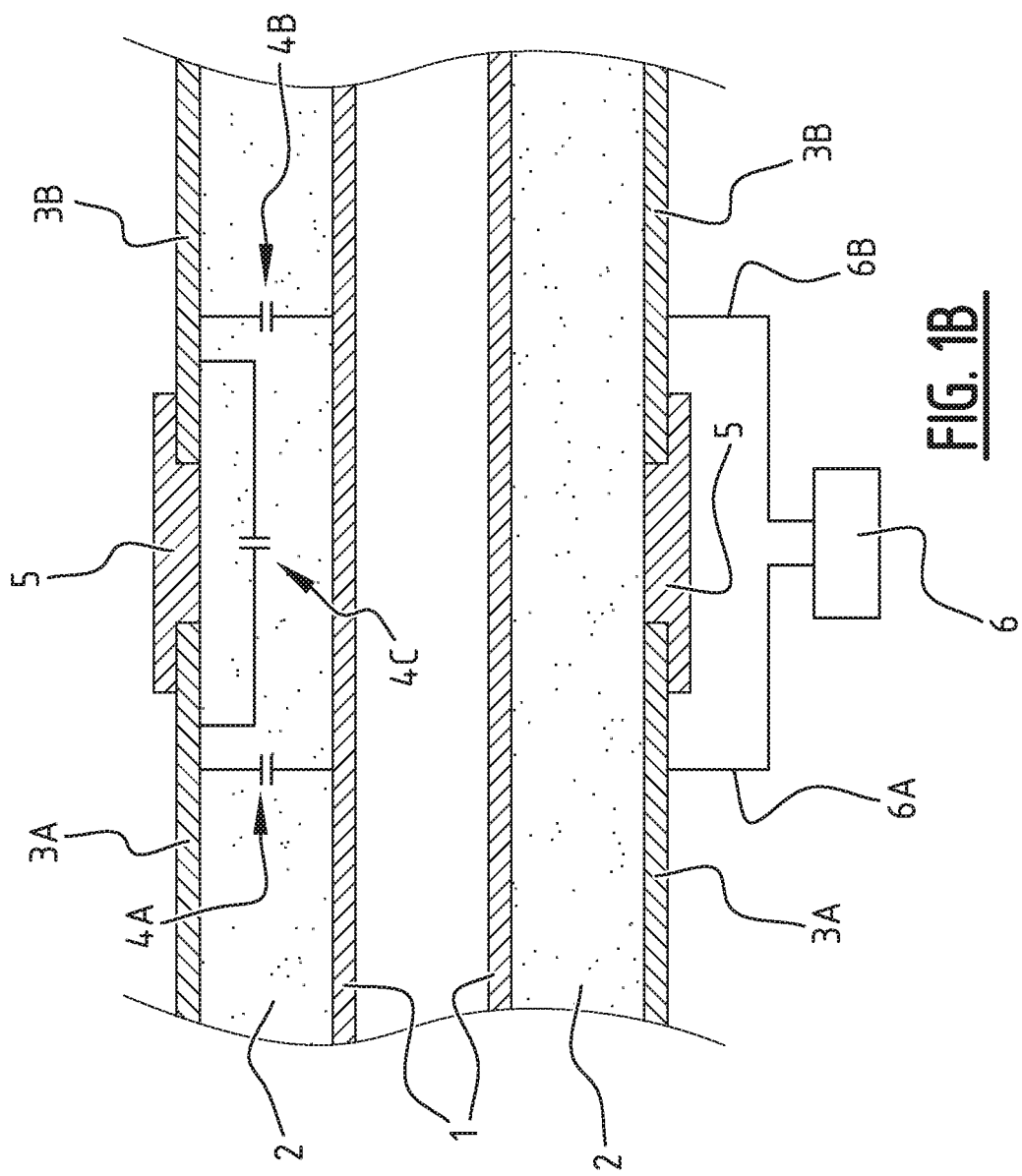
FIG. 1B is a schematic representation of another embodiment of a device according to the invention in longitudinal section along the longitudinal direction of an electrically conductive conduit.

FIG. 1B show a schematic representation of another embodiment of a device according to the invention in a longitudinal section along the longitudinal direction of an electrically conductive conduit. The figure shows first additional capacitor 4A and second additional capacitor 4B. These additional capacitors are optional in the sense that it is useful to base the determination of the value partly thereon when conduit 1 is electrically conductive, as is the case in this figure. This has the advantage that moisture and/or corrosion can be measured with more precision up to a position deeper in insulator 2 (i.e. closer to conduit 1) since electrically conductive conduit 1 is there capacitively active.

In this other embodiment the capacitive coupling can be deemed the parallel circuit of capacitor 4C on the one hand and the serial circuit of first additional capacitor 4A and second additional capacitor 4B on the other. The whole capacitive coupling can then for instance be designated as $C_{eq}$ (not shown), as done in FIGS. 2-4.

Figure 1C:
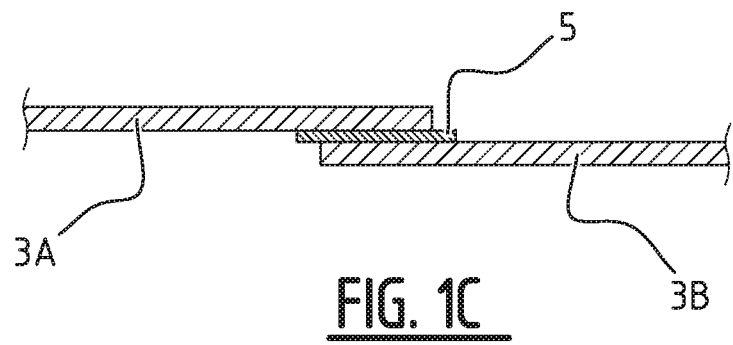
FIG. 1C is a schematic representation of a part of a first alternative embodiment of a device according to the invention.

FIG. 1C shows a schematic representation of a part of a first alternative embodiment of a device according to the invention. The figure shows particularly a cross-section of the part of the device where first conductor 3A and second conductor 3B are situated close to each other. In this first alternative embodiment of the device first conductor 3A and second conductor 3B are arranged overlapping at least partially at their respective outer ends, wherein electrically insulating strip 5 extends in a transition area between first conductor 3A and second conductor 3B over an area at least the same size as the overlap in order to prevent direct electrical conduction between first conductor 3A and second conductor 3B. Strip 5 can for instance be manufactured from rubber, which has good electrically insulating properties and moreover has good moisture resistance.

Figure 1D:
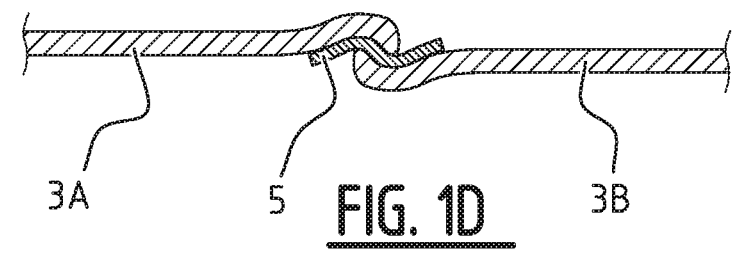
FIG. 1D is a schematic representation of a part of a second alternative embodiment of a device according to the invention.

FIG. 1D shows a schematic representation of a part of a second alternative embodiment of a device according to the invention. This second alternative embodiment differs from the first alternative embodiment shown in FIG. 1C in that the outer ends of first conductor 3A and second conductor 3B are formed in complementary manner (in this example as two mutually engaging hooks) in order to hold the strip 5 lying therebetween more firmly.

Figure 2:
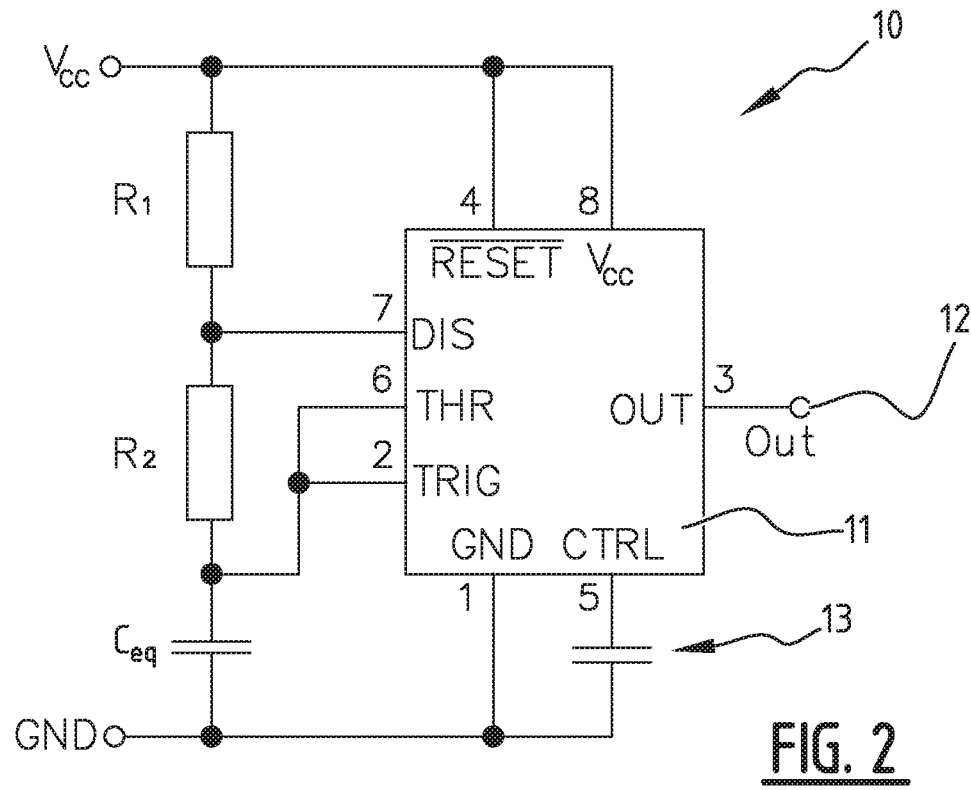
FIG. 2 is a schematic representation of an embodiment of an electronic circuit for use in a measuring instrument according to the invention.

FIG. 2 shows a schematic representation of an embodiment of an electronic circuit 10 for use in a measuring instrument according to the invention, for instance measuring instrument 6 of FIG. 1A.

Circuit 10 is powered via terminal $V_{CC}$, where during operation a voltage level can be supplied as power supply, this also being designated as $V_{CC}$—this voltage level can for instance lie between 3 and 15 volt. Circuit 10 comprises integrated circuit (IC) 11, which is here used to determine time intervals (a timer integrated circuit or IC), for instance on the basis of a 555 IC as developed by Signetics. The skilled person will appreciate that all manner of electronic components can alternatively be used, but that this present embodiment is practical since it makes use of standard components.

The power supply is supplied to IC 11 in terminal 8 ($V_{CC}$) and is also used to control terminal 4 with negative reset function ($\overline{RESET}$). If terminal 4 is grounded, IC 11 is reset.

The power supply runs over resistance R1 and is further connected to terminal 7 (DIS) of IC 11, which functions as open collector. From there, the remaining voltage runs further over resistance R2 and is further connected to terminal 6 (THR) and terminal 2 (TRIG) of IC 11, which can be used during operation to determine the start and end of the time interval.

From resistance R2, the remaining voltage runs over capacitor $C_{eq}$ to ground (GND). Capacitor $C_{eq}$ can be seen as only capacitor 4C if the conduit is electrically non-conductive, or as the parallel circuit of on the one hand capacitor 4C and on the other the serial circuit of first additional capacitor 4A and second additional capacitor 4B if the conduit is electrically conductive.

The grounding is also connected to terminal 1 (GND) of IC 11, and via capacitor 13, preferably with a low capacity, for instance 10 nF, to terminal 5 (CTRL) of IC 11. Terminal 1 can be used during operation to function as ground reference voltage (for instance 0 volt). Terminal 5 can be used during operation to provide control access to an internal voltage divider in IC 11 in order to (indirectly) control the duration of the time interval.

Output signal 12 (Out) is supplied via terminal 3 (OUT) of IC 11. During operation output signal 12 takes the form of a continuous current of rectangular voltage pulses, this current having a certain frequency ($f_{Out}$). This frequency $f_{Out}$ can be determined as follows: $f_{Out}=(C_{eq}\cdot(R1+2\cdot R2)\cdot\ln(2))$.

With this configuration circuit 10 can function as a stable multivibrator. i.e. as electronic oscillator, which produces a frequency value $f_{Out}$ which is representative of the capacitive action of the device as discussed for FIG. 1A. If desired, the frequency value $f_{Out}$ can optionally also be converted to a capacity expressed in farad, for instance using a microcontroller (not shown), although the skilled person will appreciate that this additional step is not a necessity in being able to approximate the capacitive action of the capacitor(s). The skilled person will furthermore appreciate that many other configurations of a measuring instrument are possible. For example, the measurement instrument may be configured to generate a waveform, such as a sinusoidal or square waveform, and to measure a response.

Figure 3:
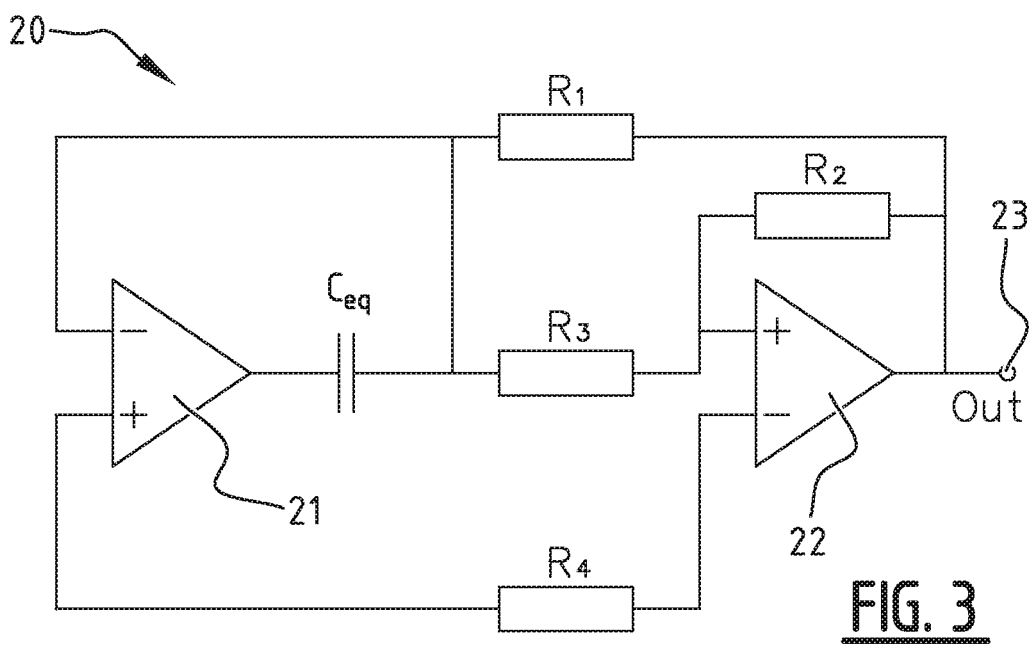
FIG. 3 is a schematic representation of an alternative embodiment of an electronic circuit for use in a measuring instrument according to the invention.

FIG. 3 shows a schematic representation of an alternative embodiment of an electronic circuit 20 for use in a measuring instrument according to the invention, for instance measuring instrument 6 of FIG. 1A.

Circuit 20 comprises opamp 21 and comparator 22. The output terminal of opamp 21 is connected in series to capacitor $C_{eq}$ with similar observations as made above with reference to FIG. 2. Capacitor $C_{eq}$ is connected to the negative input terminal of opamp 21. Capacitor $C_{eq}$ is also connected via resistance R1 to the output terminal of comparator 22. In addition, capacitor $C_{eq}$ is connected via resistance R3 to the positive input terminal of comparator 22, which in turn is connected via resistance R2 to the output terminal of comparator 22. The positive input terminal of opamp 21 is connected via resistance R4 to the negative input terminal of comparator 22. The output terminal of comparator 22 produces output signal 23 (Out). This output signal 23 can be used in similar manner as output signal 12 in FIG. 2, since they are both pulses.

Figure 4:
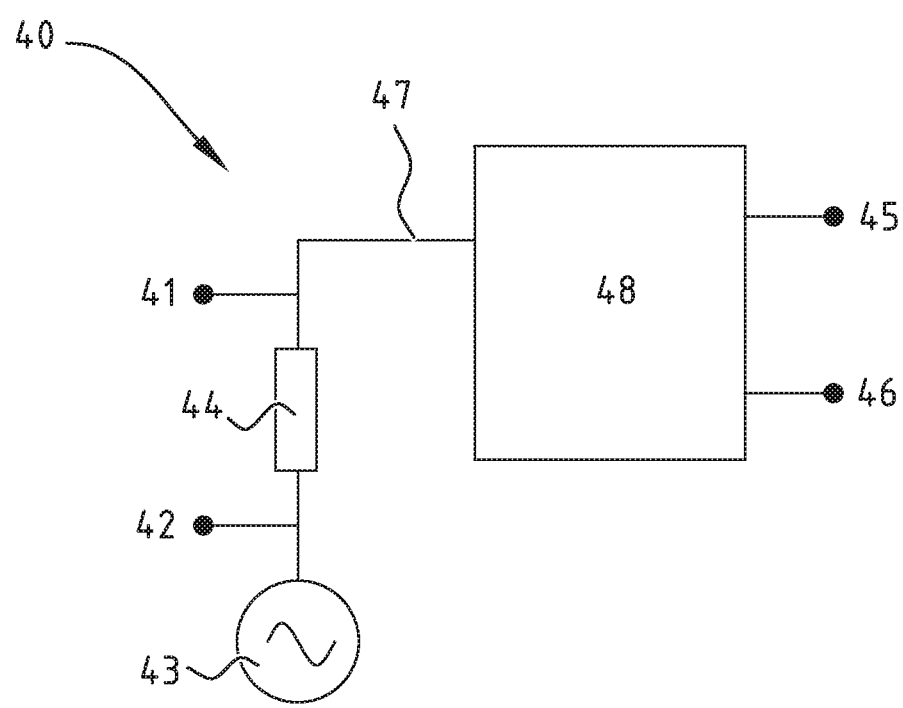
FIG. 4 is a schematic representation of another embodiment of an electronic circuit for use in a measuring instrument according to the invention.

FIG. 4 shows a schematic representation of another embodiment of an electronic circuit 40 for use in a measuring instrument according to the invention, for instance measuring instrument 6 of FIG. 1A.

Circuit 40 comprises integrated circuit (IC) 48 with terminals 45, 46 and 47. First pole 41 of the capacitor is coupled to input terminal 47. First pole 41 is coupled to second pole 42 of the capacitor over capacitive coupling 44. Source 43 drives a variable frequency alternating voltage or alternating current through capacitive coupling 44. IC 48 measures amplitude changes (for instance at output terminal 45) and/or phase changes (for instance at output terminal 46), particularly phase shifts, thereof.

Figure 5:
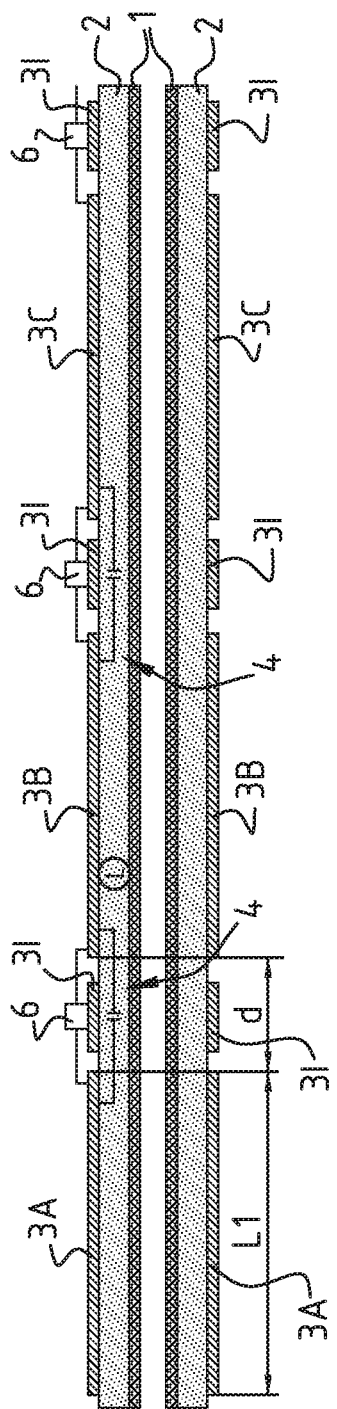
FIG. 5 is a schematic representation of an embodiment of a device in longitudinal section along the longitudinal direction of a conduit.

FIG. 5 shows a schematic representation of another embodiment of a device for measuring condensation and/or advance of corrosion of a conduit 1. The device comprises an insulator 2 extending around the conduit, a first conductor 3A, a second conductor 3B, and a third conductor 3C. The first and second conductor 3A, 3B are arranged such that at least a portion of the insulator 2 lies between the conduit 1 and the first conductor 3A and the second conductor 3B, such that the first conductor 3A forms a first pole of a capacitor 4, the second conductor 3B forms a second pole of the capacitor 4. The third conductor 3C is arranged such that at least a further portion of the insulator 2 lies between the conduit and the second and the third conductor 3B, 3C and such that the second conductor 3B forms a first pole of a further capacitor 4, the third conductor 3C forms a second pole of the further capacitor 4, and the further portion of the insulator 2 comprises a further capacitive coupling between the first pole and the second pole of capacitor 4. Seen in a longitudinal direction of the conduit, the first, second and third conductors 3A, 3B, 3C are arranged at a distance of each other.

Figure 6:
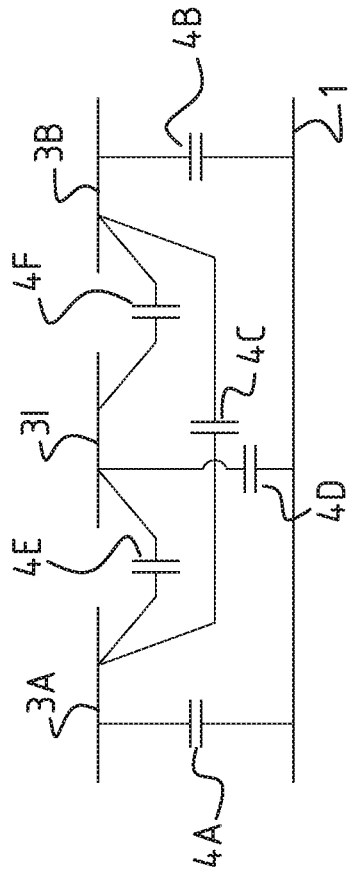
FIG. 6 is a schematic view indicating the capacitive coupling for the embodiment of FIG. 5.

The device further comprises a plurality of measuring instruments 6 configured to determine a value which is representative of the capacitive coupling between adjacent conductors 3A, 3B, 3C. A first measuring instrument 6 may be connected between first conductor 3A and second conductor 3B, a second measuring instrument 6 may be connected between second conductor 3B and third conductor 3C, etc. Between the first and the second conductor 3A, 3B an intermediate outer layer 3I, e.g. an electrically conductive intermediate layer, may be arranged around the insulator 2. This electrically conductive outer layer 3I may be grounded or floating. Similar intermediate outer layers 3I may be arranged between the other adjacent conductors 3B, 3C, etc. The intermediate conductive layer may serve as a support for a measuring instrument 6. Preferably, each conductor 3A, 3B, 3C extends over a first length L1 seen in the longitudinal direction, and a surface area of each conductor is at least 10% of a surface area of the conduit 1 along the first length, preferably at least 25%, more preferably at least 50%. It is noted that the conductors 3A, 3B, 3C may also extend over different lengths. The conductor 3A, 3B, 3C may be formed as a sleeve, such that the surface area will be even more than the surface are of the conduit along length L. However, in order to save material, the conductor 3A, 3B, 3C may be formed as a plurality of interconnected conductive layer elements, see also the example of FIG. 6. Although not shown in FIG. 5, a strip 5 which covers an area of the insulator 2 may be arranged between the first conductor 3A and the intermediate layer 3I and between the intermediate layer 3I and the second conductor 3B, similar to what has been illustrated and described in FIGS. 1A and 1B. Such a device has the advantage that with a relatively small amount of simple measuring instruments 6 a large section of piping may be monitored. Though not shown on the figures it will be clear to the skilled person that the intermediate layer 3I and the conduit 1 may be grounded or floating, or a combination of grounded and floating may be used depending on the situation. It is noted that the capacitive coupling between the first and the second conductor 3A, 3B may comprise a series/parallel connection of a plurality of "capacitors" 4A-4F to result in an equivalent capacitance $C_{eq}$ (corresponding with capacitor 4 in FIG. 5). This is illustrated in FIG. 6 where it is assumed that the intermediate layer 3I and the conduit 1 are made of an electrically conductive material.

The length L1 of a conductor 3A, 3B, 3C may be e.g. between 0.5 m and 10 m, depending on the type of conduits to be insulated. The diameter of the insulator may be e.g. between 5 mm and 1200 mm, preferably between 10 mm and 500 mm. The distance d between the first conductor 3A and the second conductor 3B may be e.g. between 1 cm and 200 cm, preferably between 2 cm and 150 cm.

Figure 7:
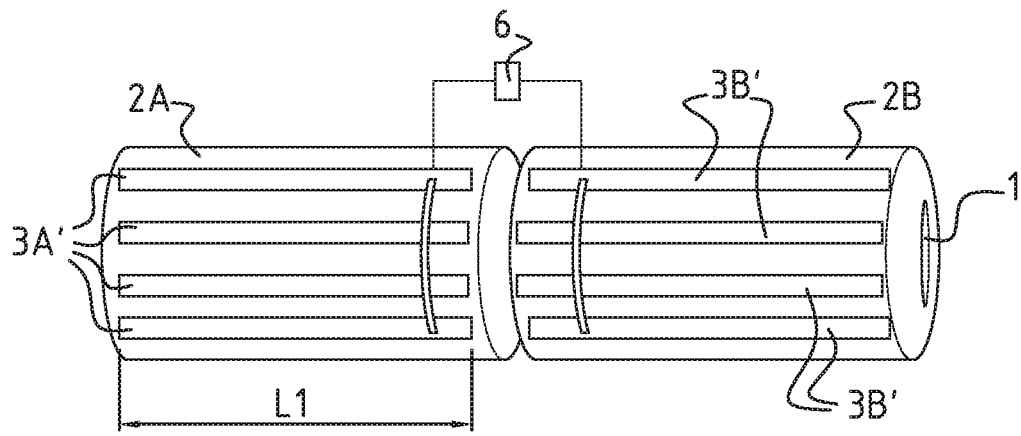
FIG. 7 is a schematic perspective view of an alternative embodiment of a device.

FIG. 7 illustrates an embodiment of a device comprising a plurality of insulator segments 2A, 2B, etc. The insulator segments 2A, 2B, also called insulation elements form together the insulator of the device. The insulator segments 2A, 2B extend around a conduit 1. A first conductor consisting of a plurality of interconnected electrically conductive layer elements 3A' and a second conductor consisting of a plurality of interconnected electrically conductive layer elements 3B' are arranged on or in the first insulator segment 2A and the second insulator segment 2B, respectively. The electrically conductive layer elements 3A', 3B' may be elongated strip-like elements extending in a longitudinal direction of the conduit 1 and arranged around the conduit 1, at a distance of each other seen in a section perpendicular to the longitudinal direction. Preferably, each conductor extends over a first length L1 seen in the longitudinal direction, and a total surface area of each conductor (i.e. of all strips 3A' or 3B') is at least 10% of a surface area of the conduit 1 along the first length, preferably at least 25%, more preferably at least 50%. A measuring instrument 6 may be connected between the first conductor 3A' and the second conductor 3B'. The space between insulator segments 2A, 2B may be filled with an insulating glue or paste. Further, any features disclosed above for other embodiments may also be applicable in the embodiment of FIG. 7.

Figure 8A:
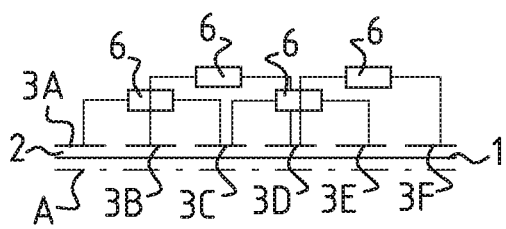
Figure 8B:
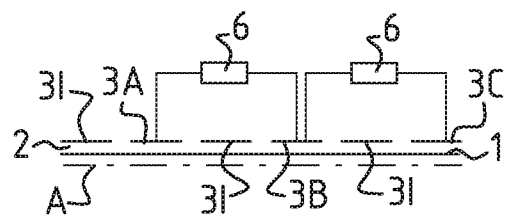
Figure 8C:
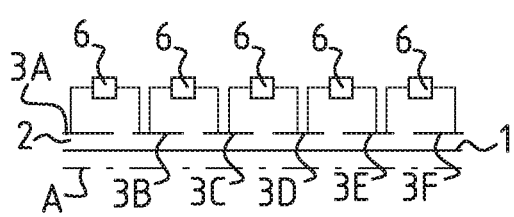
Figure 8D:
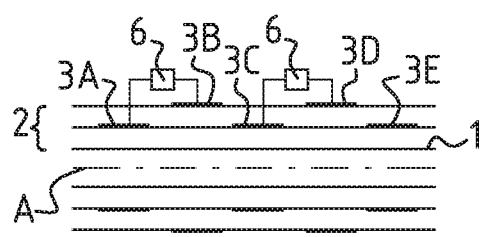

FIGS. 8A-8D illustrates different possible embodiments for performing the measurements. In the embodiment of FIG. 8A, a plurality of conductors 3A-3F are arranged next to each other on or in an insulator 2 arranged around a conduit 1 with an axis A. A first measuring instrument 6 is connected between the first conductor 3A and the third conductor 3C, a second measuring instrument 6 is connected between the second conductor 3B and the fourth conductor 3D, a third measuring instrument 6 is connected between the third conductor 3C and the fifth conductor 3E, etc. Such a set-up can provide a high accuracy. Indeed, e.g. a leakage underneath conductor 3C can be detected both by the first and the third measuring instrument 6. The embodiment of FIG. 8B is similar to the embodiment of FIG. 6, but the intermediate conductive layers 3I have the same length as the conductors 3A, 3B, 3C. In the embodiment of FIG. 5C, no intermediate unconnected layers are present, and each pair of adjacent conductors 3A, 3B; 3B, 3C; 3C, 3D; etc. is connected to a measuring instrument 6. In the embodiment of FIG. 8D, the conductors 3A, 3B, 3C, etc. are arranged at different distances from the conduit 1. For example, conductors 3A, 3C 3E may be arranged between a first and a second insulation layer of the insulator 2, whilst conductors 3B and 3D are arranged on an outer surface of the insulator. Optionally the measuring instruments 6 may also be arranged on the outer surface of the insulator 2. In an alternative embodiment all conductors 3A-3E may be arranged between a first and a second insulation layer of the insulator 2. More generally, in the embodiments of FIGS. 8A-8D all or some conductors 3A, 3B, etc. may be embedded in the insulator 2.

FIG. 9 illustrates an embodiment of an assembly of insulation elements 100A, 100B, 100C, 100D, 100E. Each insulation element 100A-E comprises an insulator sleeve 2A-2E configured for extending around a conduit 1, a conductor 3A-3E embedded in the insulator sleeve 2A-2E, and at least one connection element 103, 104 extending from the conductor 3A-3E through the insulator sleeve 2A-2E to the outer surface thereof. The conductor 3A-3E may be shaped as a conductor sleeve having a length L1 which is smaller than a length Li of the insulator sleeve 2A-2E and may be fully embedded in the insulator sleeve 2A-2E. In an alternative embodiment, the conductor 3A-3E may comprises a plurality of interconnected electrically conductive layer elements, e.g. as disclosed in connection with FIG. 7, wherein the plurality of interconnected electrically conductive layer elements are embedded in the insulator sleeve 2A-2E. The insulator sleeve 2A-2E may comprise a first insulator layer 101 and a second insulator layer 102, and the conductor 3A-3E may be arranged between the first insulator layer 101 and the second insulator layer 102. By using a plurality of interconnected electrically conductive layer elements instead of a complete sleeve for the conductors 3A-3E, the adhesion between the first insulation layer 101 and the second insulation layer 102 can be improved.

A measuring instrument 6 may be arranged on the insulator sleeve 2D, as shown for insulating element 100D. The measurement instrument 6 may be connected to conductors 3C, 3E of adjacent insulation elements 100C, 100E as shown, but could also be connected the conductor of the insulation element in which it is included (not shown in FIG. 9). The measuring instrument 106 may be configured to transmit a measured value wirelessly to a wireless receiver of a monitoring controller. To allow for an easy connection, for each insulation element 100A-E, connector elements 103, 104 pass from the outer surface of the insulator 2A-2E to the conductor 3A-3E. In the illustrated embodiment two connector elements 103, 104 are provided, one at each end of the conductor 3A-3E, but it is also possible to provide only one connector element or to provide more than two connector elements. The connector elements 103, 104 can be used to interconnect adjacent conductors. For example, conductor 3A is electrically connected to conductor 3B through connector element 104 of insulation element 100A, a connecting wire 110, and connector element 103 of insulation element 100B.

FIG. 10 illustrates another embodiment of an insulation element 100. The insulation element 100 comprises an insulator sleeve 2 configured for extending around a conduit 1, a first conductor 3A and a second conductor 3B both embedded in the same insulator sleeve 2, and a plurality of connection elements 103, 104, 105, 106 extending from the first and second conductor 3A, 3B through the insulator sleeve 2 to the outer surface thereof. The conductors 3A, 3B may be shaped as conductor sleeves at a distance d of each other, see in the axial direction, and may be fully embedded in the insulator sleeve 2. In an alternative embodiment, the conductors 3A, 3B may comprise a plurality of interconnected electrically conductive layer elements, e.g. as disclosed in connection with FIG. 7, wherein the plurality of interconnected electrically conductive layer elements are embedded in the insulator sleeve 2. The insulator sleeve 2 may comprise a first insulator layer 101 and a second insulator layer 102, and the conductors 3A, 3B may be arranged between the first insulator layer 101 and the second insulator layer 102.

A measuring instrument 6 may be arranged on the insulator sleeve 2. The measurement instrument 6 may be connected between the first and second conductors 3A, 3B, as shown, but could also be connected to a conductor of an adjacent insulation element. The measuring instrument 106 may be configured to transmit a measured value wirelessly to a wireless receiver of a monitoring controller. To allow for an easy connection, connector elements 103, 104, 105, 106 pass from the conductors 3A, 3B through second insulation layer 102. In the illustrated embodiment, per conductor, two connector elements are provided, one at each end of the conductor 3A, 3B, but it is also possible to provide only one connector element or to provide more than two connector elements per conductor 3A, 3B. The connector elements 105, 106 can be connected to a measuring instrument 6, and the other connector elements 103, 104 can be used for interconnecting adjacent insulation elements 100.

FIG. 11 illustrates an embodiment of a device and method for measuring degradation of a surface layer 200 on a conduit 1. The surface layer 200 can be a coating, a cover layer, an oxidation layer, etc. Typically the surface layer has a thickness ts which is smaller than the thickness tc of the wall of the conduit 1. For example, the surface layer 200 may have a thickness ts which is smaller than 10 mm, preferably smaller than 9 mm, more preferably smaller than 8 mm. The thickness ts of the surface layer 200 may also be of the order of microns, e.g. of the order of 100 microns. The thickness ti of the insulator may be e.g. between 5 mm and 500 mm, preferably between 9 mm and 250 mm. For example, the surface layer may be a corrosion resistant surface layer or another protective surface layer, such as a cathodic protection. The device comprises an insulator 2 extending around the surface layer 200 on the conduit 1, a first conductor 3A and a second conductor 3B at a distance of the first conductor, said first and second conductor 3A, 3B being arranged such that at least a portion of the insulator lies between the conduit and the first conductor and between the conduit and the second conductor; and a measuring instrument 6 configured to determine a value which is representative of the impedance 204C of the surface layer underneath said portion of the insulator 2. By using a first and a second conductor 3A, 3B as specified above, any external noise will be present both on the first and the second conductor, and will be cancelled out as the measurement is a differential measurement performed between the first and the second conductor 3A, 3B.

The measuring instrument 6 may comprise an electrochemical impedance spectroscopy measurement instrument or any other AC impedance measurement. Using such a measurement, the phase and amplitude of the impedance is obtained in function of the frequency. When the surface layer 200 degrades, the impedance 204C of the surface layer changes, which causes a change in the phase measurement and a change in the amplitude measurement. This is illustrated in FIGS. 12A and 12B. FIG. 12A illustrates schematically a measured curve 1203 for the phase without degradation and a curve 1204 for the phase with degradation, illustrating a change of the phase curve due to a degradation of the surface layer 200. FIG. 12B illustrates schematically a measured curve 1201 for the amplitude without degradation and a curve 1202 for the amplitude with degradation, illustrating a decrease of the amplitude due to a degradation of the surface layer 200. Also other AC or DC measurement instruments are possible as long as it is possible to determine a value which is representative of the impedance 204C of the surface layer 200 underneath said portion of the insulator 2. The other impedances 104A, 104B, 204A, 204B, 104C (shown in a simplified model in FIG. 11) will also influence the measurements, but a change of the measured value of values will be representative of a degradation of the surface layer. The device may further comprise a monitoring controller which is configured to analyse degradation of the surface layer on the basis of the value or values determined by the measuring instrument 6.

The preferred and exemplary features disclosed above for the device and method for measuring condensation and/or advance of corrosion of a conduit may also be present in the device and method for measuring degradation of a surface layer on a conduit. More in particular, the devices of FIGS. 1-10 may also be used for measuring degradation of a surface layer on a conduit when a suitable measuring instrument 6 is chosen. Also, the devices/methods may be combined, i.e. the same device may be provided with a first measurement instrument 6 to determine a value which is representative of the capacitive coupling 4C illustrated in FIG. 1A and a second measuring instrument 6 to determine a value which is representative of the impedance 204C of the surface layer underneath said portion of the insulator 2. Indeed, the same insulator 2 and first and second conductor 3A, 3B may be used to perform both measurements.

In the embodiments of FIGS. 5 and 11 the intermediate layer 3I may be used to mount one or more measurement instruments 6 and/or one or more power supplies for feeding the one or more measuring instruments 6. Further this intermediate layer 3I may be used to mount a support for fixing the conduit 1 with insulator 2 to a wall. However, it is also possible to use a set-up without an intermediate layer, e.g. as shown in FIGS. 1A-1B and 9.

The skilled person will understand that many modifications and variants can be envisaged within the scope of the invention, which is defined solely by the following claims.

The invention claimed is:

1. A device for measuring condensation on and/or advance of corrosion of a conduit, comprising:
an insulator extending around the conduit;
a first conductor and a second conductor arranged such that at least a portion of the insulator lies between the conduit and the first conductor and the second conductor, such that the first conductor forms a first pole of a capacitor, the second conductor forms a second pole of the capacitor, and the portion therebetween comprises a capacitive coupling between the first pole and the second pole,
wherein, in a longitudinal direction of the conduit, the first and second conductors are arranged at a longitudinal distance from each other along the longitudinal direction of the conduit, or the first and second conductors overlap only partially at an outer end thereof and have an electrically insulating strip disposed between the overlapping portions of the first and second conductors such that there is no direct contact between the two; and
at least one measuring instrument configured to determine a value representative of the capacitive coupling.

2. The device according to claim 1, wherein the first conductor and the second conductor are each embodied as an electrically conductive coating or cladding for the insulator.

3. The device according to claim 1, wherein the first conductor and the second conductor are each shaped as at least a portion of an electrically conductive sleeve configured to accommodate at least a portion of the insulator.

4. The device according to claim 1, wherein the at least one measuring instrument is configured to determine a frequency value which is representative of the capacitive coupling.

5. The device according to claim 1, wherein the at least one measuring instrument is configured to drive a variable frequency alternating voltage or current through the capacitive coupling and to measure amplitude and phase changes thereof.

6. The device according to claim 1, wherein the at least one measuring instrument comprises at least one oscillator.

7. The device according to claim 1, wherein the conduit is grounded or floating.

8. The device according to claim 1, wherein a first measuring instrument of said at least one measuring instrument is fixed on or in the insulator or on an outer layer on the insulator.

9. The device according to claim 1, comprising a third conductor which is arranged such that at least a further portion of the insulator lies between the conduit and the second conductor and between the conduit and the third conductor; wherein the at least one measuring instrument is configured to perform a measurement between the second and the third conductor.

10. The device according to claim 1, wherein the first conductor extends over a first length seen in the longitudinal direction, and wherein a surface area of the first conductor is at least 10% of a surface area of the conduit along the first length.

11. The device according to claim 1, wherein the at least one measuring instrument is integrated in the insulator.

12. The device according to claim 1, wherein the at least one measuring instrument is configured to transmit the determined value wirelessly to a wireless receiver of a monitoring controller.

13. The device according to claim 1, wherein a transition area between the first conductor and the second conductor comprises a moisture-resistant strip comprising one of butyl tape and rubber.

14. The device according to claim 1, comprising a monitoring controller which is configured to analyse condensation and/or advance of corrosion of the conduit on the basis of the value or values determined by the or each measuring instrument.

15. The device according to claim 14, comprising at least one temperature sensor configured to measure a temperature, and/or at least one moisture sensor configured to measure a degree of moisture; wherein the monitoring controller is configured during analysis of the condensation and/or advance of corrosion to take into account the measured temperature and/or the measured degree of moisture.

16. A device for measuring degradation of a surface layer of a conduit, comprising:
an insulator extending around the surface layer on the conduit;
a first conductor and a second conductor at a distance of the first conductor, said first and second conductor being arranged such that at least a portion of the insulator lies between the conduit and the first conductor and between the conduit and the second conductor,
wherein, the first and second conductors are arranged in a longitudinal direction of the conduit at a longitudinal distance from each other, or the first and second conductors overlap only partially at an outer end thereof and have an electrically insulating strip disposed between the overlapping portions of the first and second conductors such that there is no direct contact between the two; and
at least one measuring instrument configured to determine an impedance value between the first and second conductors which is representative of the impedance of the surface layer underneath said portion of the insulator.

17. The device according to claim 16, wherein the at least one measuring instrument comprises an electrochemical impedance spectroscopy measurement instrument and/or a D.C. measurement apparatus.

18. The device according to claim 16, comprising a monitoring controller which is configured to analyse degradation of the surface layer on the basis of the value or values determined by the at least one measuring instrument.

19. The device according to claim 16, wherein the surface layer is any one of the following: a coating, a cover layer, an oxidation layer.

20. A method for measuring condensation on and/or advance of corrosion of a conduit, comprising:
arranging an insulator around the conduit;
arranging a first conductor and a second conductor such that at least a portion of the insulator lies between the conduit and the first conductor and the second conductor, the portion extending along a longitudinal direction of the conduit such that the first conductor forms a first pole of a capacitor, the second conductor forms a second pole of the capacitor, and the portion therebetween comprises a capacitive coupling between the first pole and the second pole, wherein, in a longitudinal direction of the conduit, the first and second conductors are arranged at a longitudinal distance from each other along the longitudinal direction of the conduit, or the first and second conductors overlap only partially at an outer end thereof and have an electrically insulating strip disposed between the overlapping portions of the first and second conductors such that there is no direct contact between the two; and determining a value which is representative of the capacitive coupling.

* * * * *